(12) United States Patent
Verzulli

(10) Patent No.: US 6,426,820 B1
(45) Date of Patent: Jul. 30, 2002

(54) REMOTE CONTROL INCORPORATING SELF-TEST CAPABILITY

(75) Inventor: Christopher J. Verzulli, Setauket, NY (US)

(73) Assignee: U.S. Electronics Components, Corp., Port Jefferson, NY (US)

(*) Notice: Subject to any disclaimer, the term of this patent is extended or adjusted under 35 U.S.C. 154(b) by 0 days.

(21) Appl. No.: 09/571,292

(22) Filed: May 16, 2000

Related U.S. Application Data
(60) Provisional application No. 60/134,558, filed on May 17, 1999.

(51) Int. Cl.[7] .............................................. H04B 10/00
(52) U.S. Cl. .................... 359/142; 359/110; 359/143; 359/144; 340/825.72; 340/825.69; 340/825.22; 340/825.16; 348/734
(58) Field of Search ................................ 359/110, 142, 359/143, 144; 340/825.72, 825.69, 825.16, 825.22; 348/734

(56) References Cited

U.S. PATENT DOCUMENTS

| | | | | |
|---|---|---|---|---|
| 5,081,628 A | * | 1/1992 | Maekawa et al. .............. 371/34 |
| 5,276,692 A | * | 1/1994 | Kwon ........................ 371/5.1 |
| 5,287,210 A | * | 2/1994 | Sefidvash .................... 359/147 |
| 5,345,230 A | * | 9/1994 | Jackson et al. ........ 340/825.16 |
| 5,506,709 A | * | 4/1996 | Segal et al. ................. 359/110 |
| 5,578,999 A | * | 11/1996 | Matsuzawa et al. ... 340/825.22 |
| 5,764,395 A | | 6/1998 | Iwata |
| 5,926,302 A | | 7/1999 | Hirohashi et al. |
| 5,945,921 A | | 8/1999 | Seo et al. |
| 5,969,835 A | * | 10/1999 | Kamieniecki et al. ........ 359/10 |
| 6,005,490 A | | 12/1999 | Higashihara |
| 6,249,673 B1 | * | 6/2001 | Tsui ............................. 455/92 |

OTHER PUBLICATIONS

International Search Report—Prepared for Corresponding International Application No. PCT/US00/13548.

* cited by examiner

Primary Examiner—Leslie Pascal
Assistant Examiner—Hanh Phan
(74) Attorney, Agent, or Firm—Hoffmann & Baron, LLP

(57) ABSTRACT

A remote control is provided for controlling various electronic apparatus such as televisions, videocassette recorders, stereo systems, cable boxes, and the like. The remote control includes a loop-back, self-test capability, which indicates the operability of the remote control without additional testing apparatus. Status of the self-test, and thus the remote control, is indicated to the user by an audio/visual status indicator located on the remote control. The remote control optionally includes two infrared diodes to transmit a self-test signal with a reduction in directionality limitations.

10 Claims, 3 Drawing Sheets

REMOTE CONTROL INCORPORATING SELF-TEST CAPABILITY

CROSS-REFERENCE TO RELATED APPLICATION

This application is based on Provisional Patent Application Ser. No. 60/134,558 filed on May 17, 1999, the disclosure of which is incorporated herein by reference.

BACKGROUND OF THE INVENTION

This invention relates generally to a programmable universal remote control, and more specifically relates to the testing of universal remote controls.

Remote controls are typically used to control a wide assortment of electronic equipment such as televisions, videocassette recorders (VCRs), stereos, cable boxes, and the like. These remote controls utilize infrared signals to command the operation of a particular electronic apparatus. By pressing a certain key on a keypad of the remote control, the user causes the remote control to transmit an infrared signal to the electronic apparatus. The infrared signal is received by the electronic apparatus, the content of the infrared signal is processed, and the apparatus performs a particular function, such as changing the channel or increasing the volume.

Due to their size, weight, and the circumstances under which they are used, such remote controls typically undergo a tremendous amount of rough handling by users of all ages. This handling can damage relatively sensitive infrared transmission circuitry within the remote control, which causes the remote control to malfunction. The user experiences this malfunction as an inability to control a particular electronic apparatus, but what the user does not know, is whether it is the remote control or the electronic apparatus that is malfunctioning.

For example, the remote control will be incapable of changing channels on the television if either the infrared transmission circuit in the remote control is malfunctioning, or the infrared receiving circuit on the television is malfunctioning. Thus, it would be advantageous if the user could determine which component (the remote control or the television) is malfunctioning so that the correct component could be serviced.

Such a problem becomes magnified in the case of cable television company that gets hundreds or even thousands of remote controls returned from cable subscribers. In this case, the cable company needs to determine which remote controls are in working order prior to re-issuing the same remote controls to new customers. Thus, it would be advantageous if the cable company could employ a simple, cost-effective method of determining whether individual remote controls are operable without the need for additional external test apparatus.

SUMMARY OF THE INVENTION

In accordance with the present invention a method of testing a remote control is provided, which includes generating a output test code and an output test signal, which is representative of the output test code. The output test signal is transmitted and received by the remote control, and an input test code is generated, which is representative of the received output test signal. The input test code is compared to the output test code, and an indication is made regarding whether the input test code is substantially equivalent to the output test code.

In further accordance with the present invention, a remote control is provided for controlling various electronic apparatus such as televisions, VCRs, stereo systems, cable boxes, and the like. The remote control includes a loop-back, self-test capability, which indicates the operability of the remote control without additional testing apparatus. Status of the self-test, and thus the remote control, is indicated to the user by an audio/visual status indicator located on the remote control.

The remote control includes a processing circuit, a memory device, at least one transmitter, and a receiver. The memory device is responsive to the processing circuit and stores an output test code. The processing circuit generates an output test signal, which is representative of the output test code. The first transmitter transmits the output test signal, and the receiver receives the output test signal. The processing circuit generate an input test code, which is representative of the received input test signal, and compares the input test code to the output test code. The processing circuit then generates a comparison signal, which is representative of whether the input test code is substantially equivalent to the output test code.

As a result of the present invention, a remote control is provided, which incorporates self-test capability and can control a variety of different electronic apparatus. In addition, the remote control provides audio and/or visual indication of operability, and indicates the status of the self test without the need for additional external test apparatus.

These and other objects, features and advantages of the present invention will become apparent from the following detailed description of the illustrative embodiments thereof, which is to be read in connection with the accompanying drawings.

DETAILED DESCRIPTION OF THE PREFERRED EMBODIMENTS

Figure 1:
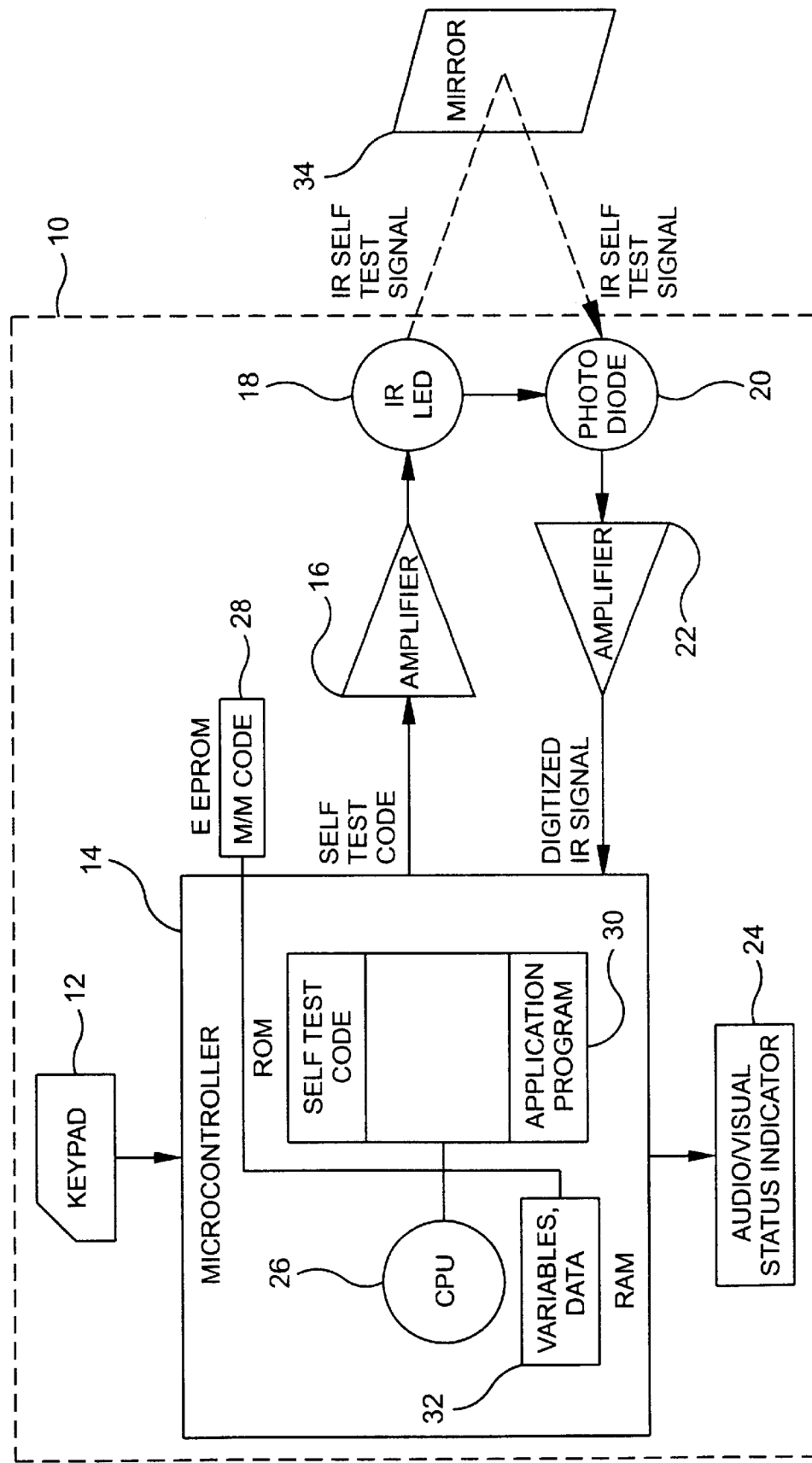
FIG. 1 is a block diagram of a remote control formed in accordance with the present invention showing an optional external mirror.

FIG. 1 shows a block diagram of a remote control 10 formed in accordance with the present invention. The remote control 10 includes a keypad 12, a microprocessor, application specific integrated circuit (ASIC), programmable logic device, or microcontroller 14; a first amplifier 16; a transmitter or infrared (IR) light-emitting (LED) 18; a receiver or photo-diode 20; a second amplifier 22; an optional electrically-erasable, programmable, read-only memory (EEPROM) 28; and an audio/visual status indicator 24.

The microcontroller 14 typically includes a central processing unit (CPU) 26, a read-only memory (ROM) 30, and a random access memory (RAM) 32. The CPU 26 executes an application program resident in the ROM 30. The application program preferably includes the method of the present invention as well as program code commonly resident in remote controls. The ROM 30 also contains a comprehensive self-test code to be described herein. The EEPROM 28 provides storage which may be modified by the CPU 26, but which is retained even after power (batteries) is removed. The EEPROM 28 preferably contains the device code, such as a manufacturer/model (M/M) code, which is used to determine the set of program codes that must be transmitted to control a specific electronic device or apparatus. The RAM 32 provides memory for data and variables that may be modified by the CPU 26, but which is lost when power is removed.

The user selects a self-test button or sequence of buttons on the keypad 12 in order to initiate a self-test mode. Alternatively, the self test can be initiated automatically following the elapse of a given time period and terminated in a similar manner. The CPU 26 in the microcontroller 14 then retrieves the self-test code, which is stored in the ROM 30, and outputs the self-test code to the amplifier 16. The amplifier 16 preferably translates the self-test code, which is digital, to an analog signal suitable for the IR LED 18. The amplifier 16 preferably includes a number of transistors, resistors, and other discrete devices well known in the prior art, which function to transform the digital signal from the microcontroller 14 to the analog signal having voltage levels, rise and fall times, current drive, and the like suitable for the IR LED 18.

The IR LED 18 then transmits an IR self-test signal, the contents of which are representative of the self-test code, to the photo-diode 20. The photo-diode 20 receives the IR self-test signal and outputs an electronic version of the IR signal to the second amplifier 22, which digitizes the IR signal and outputs it to the microcontroller 14. The photo-diode 20 and amplifier 22 are preferably realized using a device having a part number of TSOP 1838, which is commercially available from Temic Corporation located in Heilbronn, Germany.

The CPU 26 compares the content of the digitized IR signal to the self-test code, and if they match within predetermined acceptable tolerances, outputs the appropriate status to the audio/visual status indicator 24. The audio/visual status indicator 24 can be an LED, a piezo-electric element, a liquid crystal display (LCD), and the like. The audio/visual indicator 24 may include one indicator having one or more tones or colors, or may be a set of indicators each having a different tone or color. Thus, the remote control 10 formed in accordance with the present invention provides a loopback, self-test function, which comprehensively tests substantially all of the components in the remote control 10.

The self-test code could be any or all of the following, assuming the self-test code is eight bits long:

(a) 55H;
  (b) AAH;
  (c) A sequence of "walking 1's" (I, 01H, 02H, 04H, 08H, 10H, 20H, 40H, 80H); and
  (d) The complete set or a subset of the complete set of program codes to control the specific electronic apparatus as determined by the current M/M code. The self-test sequence entered by the user on the keypad that initiates the self-test mode is preferably an abnormal sequence of keys not typically encountered during the operation of the remote control 10, a dedicated self-test key, or any other action performed by the user to initiate the self-test mode.

An alternative embodiment includes the use of a mirror 34 as a reflective surface for the IR self-test signal following transmission by the IR LED 18. However, it has been found in practice that the IR LED 18 emits a sufficient amount of IR energy to be detected by the photo-diode 20 without being reflected by an additional surface such as the mirror 34.

Figure 2:
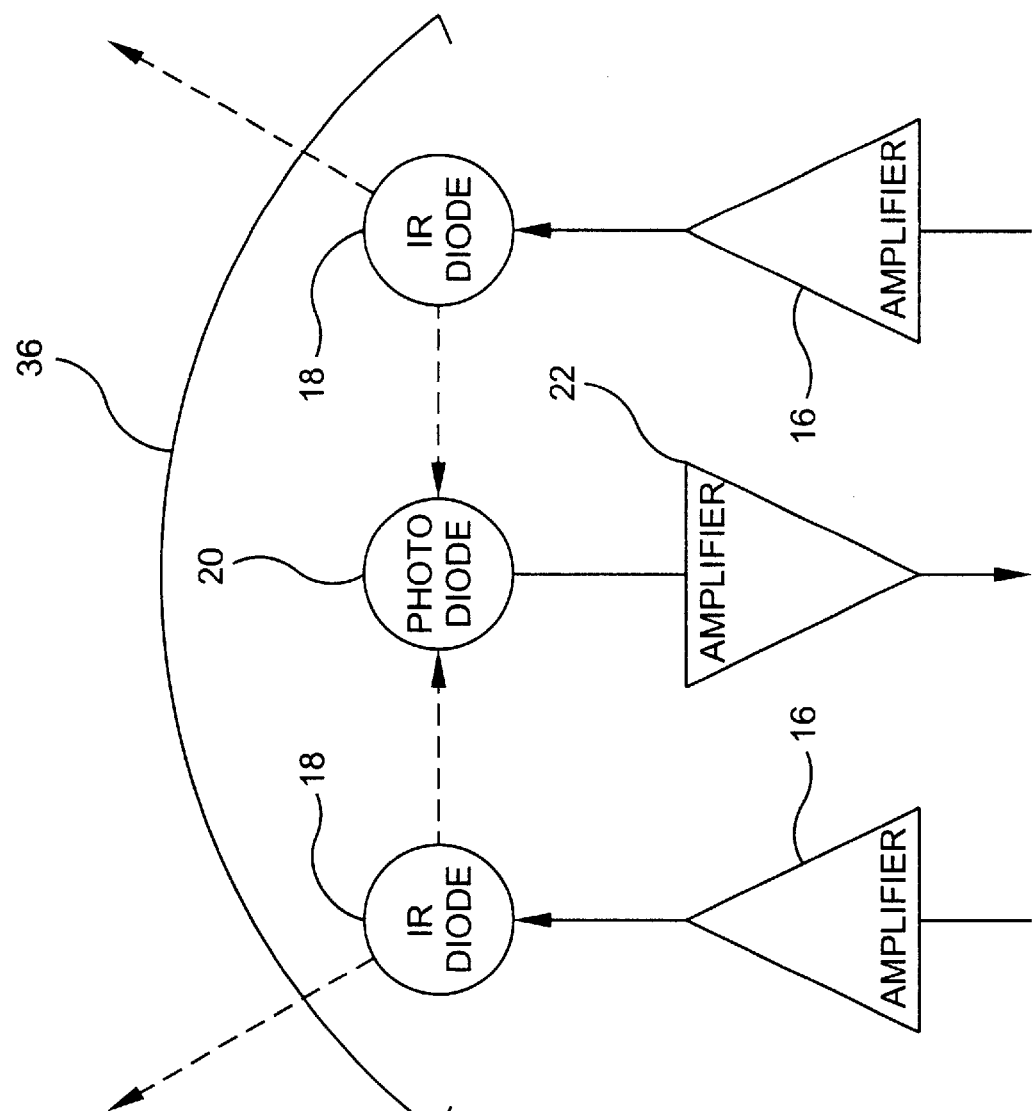
FIG. 2 is a second embodiment of a configuration for infrared diodes for use in the remote control formed in accordance with the present invention.

FIG. 2 shows an alternative embodiment for the configuration of the IR diode 18 in which two IR diodes 18 are used to create a wider IR beam from the remote control. It has been found in practice that the wider beam of infrared light reduces the limitations of directionality commonly associated with remote controls having a single IR LED 18, and thus makes it easier for the user to control the electronic apparatus. A lens 36 is shown disposed in front of the IR diodes 18 and the photo-diode 20, which provides an additional level of physical protection for the diodes. The lens is preferably manufactured from plastic or a polycarbonate lexan.

Figure 3:
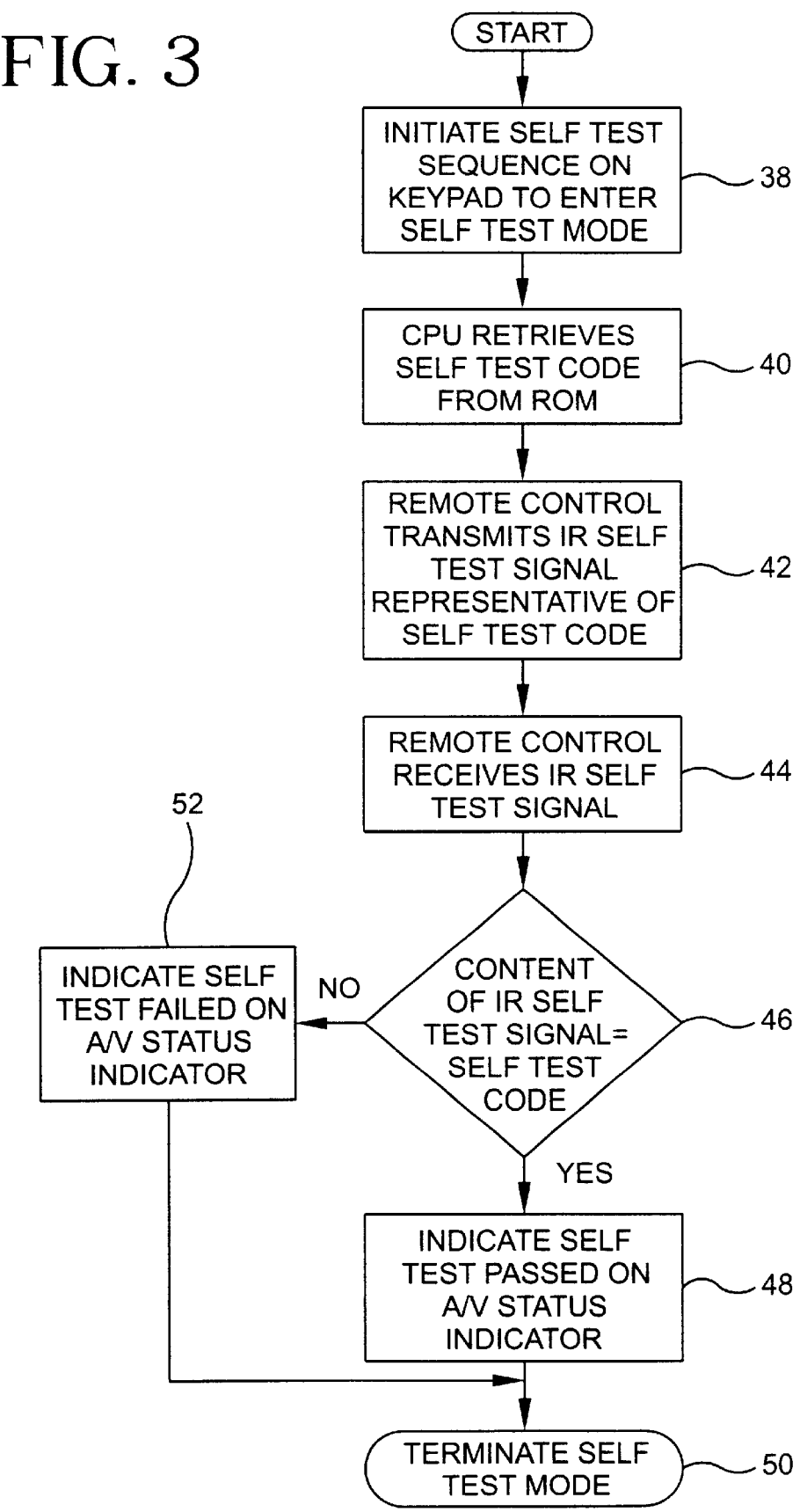
FIG. 3 is a flow chart showing the steps performed during a self test of the remote control formed in accordance with the present invention.

FIG. 3 is a flow chart showing the steps performed during the self-test mode. In step 38, the user selects the self-test button or sequence of buttons on the keypad in order to initiate the self-test mode. Alternatively, the self test can be initiated automatically following the elapse of a given time period and terminated in a similar manner. The CPU then retrieves the self-test code or output test code from the ROM in step 40, and the remote control transmits the IR self-test signal, which is representative of the self-test code, in step 42. The photo-diode in the remote control then receives an IR signal in step 44, and the content of the IR signal or input test code is compared to the self-test code in step 46. The results of the comparison are indicated as a passed or failed status provided to the audio/visual status indicator in steps 48 and 52, respectively. The self-test mode is terminated in step 50. The IR self-test signal in optionally be reflected from a reflective surface following its transmission.

From the foregoing description, it will be appreciated by those skilled in the art that a method and apparatus formed in accordance with the present invention provide a remote control, which is able to control many different electronic devices and perform a self test without the need for additional, external test apparatus. It will also be appreciated that the method and apparatus formed in accordance with the present invention enables the status of a remote control self test to be displayed as an audio and/or visual indication of operability.

Although, illustrative embodiments of the present invention have been described herein with reference to the accompanying drawings, it is to be understood that the invention is not limited to those precise embodiments, and that various other changes and modifications may be affected therein by one skilled in the art without departing from the scope or the spirit of the invention.

What is claimed is:

1. A remote control, the remote control comprising:
   a processing circuit;
   a memory device, the memory device being responsive to the processing circuit, the memory device storing an output test code, the processing circuit generating an output test signal, the output test signal being representative of the output test code;
   a first transmitter, the first transmitter being responsive to the processing circuit, the first transmitter transmitting the output test signal;
   a receiver, the receiver being responsive to the processing circuit, the receiver receiving the output test signal, the receiver outputting the received output test signal to the processing circuit, the processing circuit generating an input test code, the input test code being representative of the received input test signal, the processing circuit comparing the input test code to the output test code, the processing circuit generating a comparison signal, the comparison signal being representative of whether the input test code is substantially equivalent to the output test code; and a second transmitter, the second transmitter being responsive to the processing circuit, the second transmitter transmitting the output test signal.

2. A remote control, the remote control comprising:

a processing circuit;

a memory device, the memory device being responsive to the processing circuit, the memory device storing an output test code, the processing circuit generating an output test signal, the output test signal being representative of the output test code;

a first transmitter, the first transmitter being responsive to the processing circuit, the first transmitter transmitting the output test signal;

a receiver, the receiver being responsive to the processing circuit, the receiver receiving the output test signal, the receiver outputting the received output test signal to the processing circuit, the processing circuit generating an input test code, the input test code being representative of the received input test signal, the processing circuit comparing the input test code to the output test code, the processing circuit generating a comparison signal, the comparison signal being representative of whether the input test code is substantially equivalent to the output test code;

a second transmitter, the second transmitter being responsive to the processing circuit, the second transmitter transmitting the output test signal, the second transmitter including an infrared (IR) light-emitting diode (LED).

3. A remote control as defined by claim 1, wherein the processing circuit includes at least one of a microcontroller, a microprocessor, an application specific integrated circuit (ASIC), and a programmable logic device.

4. A remote control as defined by claim 1, wherein the first transmitter includes an infrared (IR) light-emitting diode (LED).

5. A remote control as defined by claim 1, wherein the receiver includes a photo-diode.

6. A remote control as defined by claim 1, further including an indicator, the indicator being responsive to the comparison signal, the indicator indicating whether the input test code is substantially equivalent to the output test code.

7. A remote control as defined by claim 6, wherein the indicator includes at least one of a light-emitting diode and a speaker.

8. A remote control as defined by claim 1, wherein the remote control has a test mode and at least one button, the test mode being initiated in response to selecting the at least one button, the test mode being terminated in response to selecting the at least one button.

9. A remote control as defined by claim 1, wherein the remote control has a test mode, the test mode being initiated in response to an elapse of a first time period, the test mode being terminated in response to an elapse of a second time period.

10. A remote control as defined by claim 1, wherein the receiver receives the output test signal following reflection of the output test signal from a reflective surface.

* * * * *

UNITED STATES PATENT AND TRADEMARK OFFICE
CERTIFICATE OF CORRECTION

PATENT NO.    : 6,426,820 B1
DATED         : July 30, 2002
INVENTOR(S)   : Christopher J. Verzulli It is certified that error appears in the above-identified patent and that said Letters Patent is hereby corrected as shown below:

<u>Column 3,</u>
Line 51, it now reads "I, 01H", it should read -- e.g., 01H --; and
Line 56, it now reads "keypad", it should read -- keypad 12 --.

<u>Column 4,</u>
Line 27, it now reads "signal in optionally", it should read -- signal can optionally --.

Signed and Sealed this

Fourteenth Day of January, 2003

JAMES E. ROGAN
*Director of the United States Patent and Trademark Office*